MECHANICALLY SETTABLE MAGNETIC REGISTER

Filed Feb. 8, 1966

INVENTOR.
RICHARD L. SNYDER
BY
Roland A. Anderson
ATTORNEY

INVENTOR.
RICHARD L. SNYDER
BY Roland A. Anderson
ATTORNEY

May 27, 1969 R. L. SNYDER 3,447,144

MECHANICALLY SETTABLE MAGNETIC REGISTER

Filed Feb. 8, 1966 Sheet 3 of 3

INVENTOR.
RICHARD L. SNYDER

BY
Roland Q. Anderson
ATTORNEY

United States Patent Office 3,447,144
Patented May 27, 1969

3,447,144
MECHANICALLY SETTABLE MAGNETIC REGISTER

Richard L. Snyder, New Smyrna Beach, Fla., assignor to the United States of America as represented by the United States Atomic Energy Commission Filed Feb. 8, 1966, Ser. No. 526,333
Int. Cl. G11b 5/00
U.S. Cl. 340—174.1 9 Claims

ABSTRACT OF THE DISCLOSURE

A magnetic memory comprising a helically wound magnetic wire in which information may be recorded and stored in the form of magnetic domains, propagation elements for shifting the domains, a head arrangement mounted on a lead screw and movable adjacent the magnetic wire for positioning to read or record the domains, and an electrically conducting stationary helix that is coaxial with the magnetic wire helix and lead screw and threaded through the head arrangement for inductively coupling the movable head to external circuits.

The invention disclosed herein was made under, or in, the course of Contract No. AT(29-1)-789 with the United States Atomic Energy Commission.

This invention relates to digital information storage devices and in particular to magnetic shift registers wherein information is stored in the form of magnetic domains along the length of a magnetizable material.

In digital computers and other devices utilizing binary information in the form of time dependent, serially arranged, electrical pulses, it is desirable to incorporate memory devices having registers in which binary information may be conveniently entered and stored for later reference during computer operation. Of the prior art magnetic memory devices, i.e., rotating magnetic drums or discs, moving magnetic tape, magnetic core matrices, magnetic shift registers, etc., magnetic shift registers offer the advantages of a relatively large storage capacity with few or no moving parts, as in the case of drums, discs, tapes or the like without the concomitant use of complicated electronic circuitry.

Magnetic shift registers, which operate on the principle of creating a magnetic domain in a magnetizable wire and then magnetically propagating, i.e., "pushing" the domain along the wire, have, in the past, required that the propagating magnetic field be present in order to enter information into the register. This, of course, necessitates complicated electronic gating circuitry in order for the information to be entered into the register. The prior art registers, thus required that the information signal constituting digital data be in the form of time dependent serially arranged electrical pulses as would be received from a digital computer.

The device of the present invention eliminates the need for complicated electronic gating circuitry and the requirement that the input information signal be in the form of time dependent serially arranged electrical pulses, by providing a means whereby digital information may be manually entered in the register for retrieval at a later time as desired. In addition, the register of this invention need not be connected to a computer or other device where the data is to be used when entering the information in the register. Thus, the use of expensive computer time is reduced. The information may be entered into the register while disconnected or when physically removed from the computer or other devices and then later connected.

Accordingly, objects of the present invention are to provide a new and improved type of magnetically settable register; to provide a magnetically settable register wherein digital information is entered manually at any position in the register; to provide a magnetically settable register wherein the amount of information stored therein is controlled mechanically; and to provide a magnetically settable register in which digital information may be entered in the register while it is electrically and/or mechanically disconnected from the computer or other equipment.

Other and more particular objects of this invention will be manifest upon study of the following detailed description when taken together with the accompanying drawings, in which.

Figure 1:
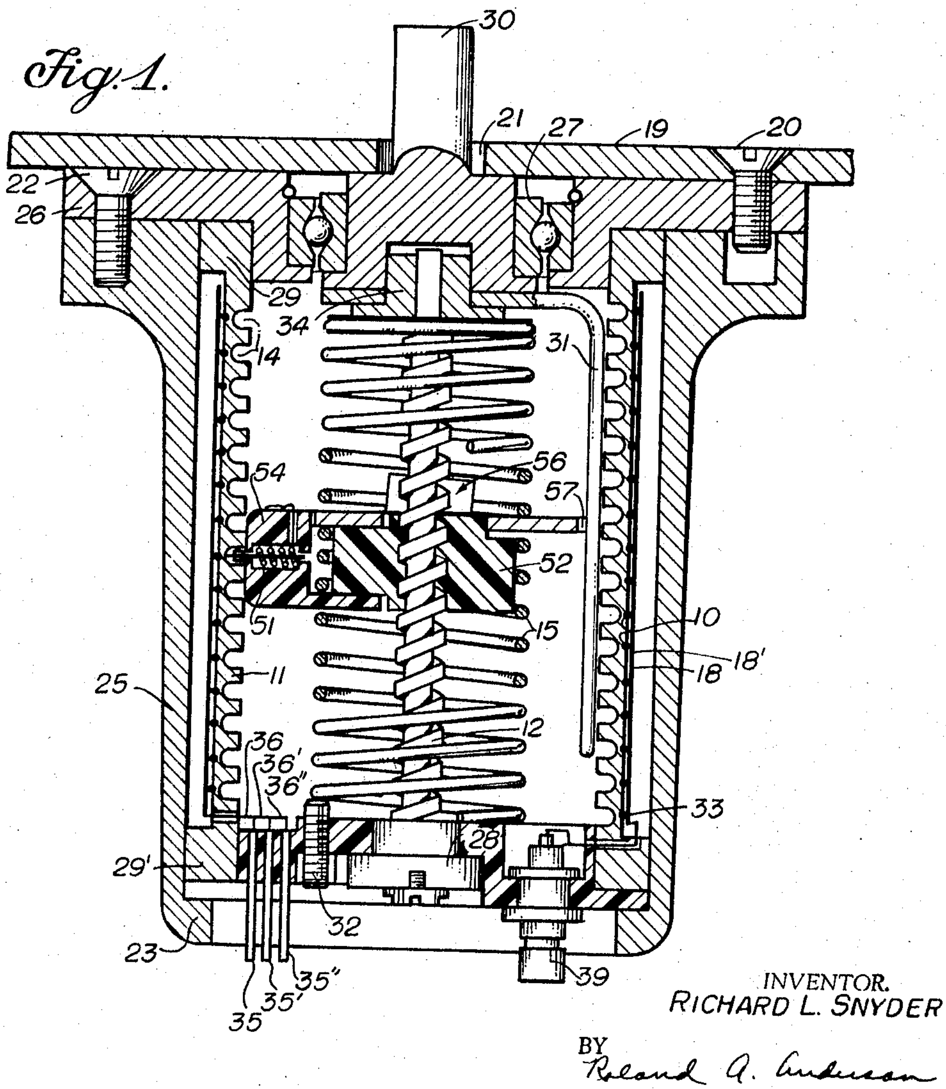
FIGURE 1 is a longitudinal section through the register device of this invention showing the assembled position of the parts.

The preferred embodiment of this invention is best illustrated in FIGURE 1. The basic operating elements of the register comprise an elongated magnetizable element 10 constructed of a suitable ferromagnetic material, in this embodiment defined as a nickel-steel wire, wound in an open helix around the outside of a mounting cylinder 11 (see also FIGURE 4) with writing head assembly 50, guided to follow along magnetic element 10 by cooperative action between helical chase 14 on the inner surface of mounting cylinder 11 and lead screw 12 coincident with the longitudinal axis of cylinder 11 and arranged to rotate about lead screw 12 upon rotation of drive arm shaft 30 and drive arm 31 connected thereto. Write coil 51 in writing head assembly 50 is so placed in writing head 54 and chine 59 as to slide in helical chase 14 in as close proximity to magnetizable element 10 as the depth of helical chase 14 will permit so that a magnetized domain can be created at selected locations in element 10.

Propagating conductors 18 and 18' (see also FIGURE 4) are disposed longitudinally in alternating parallel spaced cylindrical array circumjacent magnetizable element 10 with said conductors at right angles to said magnetizable element. As will be discussed more fully infra, propagating conductors 18 and 18' are used to establish a polyphase rotating magnetic field for the purpose of moving the magnetized domains, created by energizing write coil 51, along magnetizable element 10 to a read coil 33 in which an electrical current pulse is generated as the magnetized domain passes through the coil.

In more complete detail, referring again to FIGURE 1, the preferred embodiment of this invention is designed to be fitted to a control panel having a face plate 19 and an opening 21 through which protrudes drive shaft 30 for a sufficient distance to permit attachment of an indexing device, e.g., a dial knob or the like (not shown) which may be used to rotate shaft 30. Several fastening screws 20 or the like, of which only one is shown in FIGURE 1, may be used to attach the register of this invention to face plate 19.

To protect the operating portion of the register device from dust, dirt and the like, outer cylindrical housing 25 is provided having a cover plate 26 and a base plate 28. Cover plate 26 is fastened to the top opening of housing 25 by means of several screw fasteners 22 only one of which is shown in FIGURE 1. Base plate 28 is arranged, for convenience, to rest on inwardly projecting flange 23 at the lower end of housing 25 and is constructed from any suitable electrically insulating material common in the art. Through base plate 28 penetrate all of the electrical connections to the various internal parts of the register, e.g., propagating connectors 35, 35' and 35'' respectively phase 1, phase 2 and ground connections, write helix connector 32, and read coil coaxial connector 36.

Mounting cylinder 11 is arranged and maintained in concentric spaced apart relation within housing 25 by means of outwardly projecting top and bottom lips 29 and 29' respectively. Mounting cylinder 11 may be constructed from any nonmagnetic material, e.g., aluminum, brass, copper, and the like having been found to function satisfactorily, however, it is preferred that a nonconducting, nonmagnetic material be used e.g., a methyl methacrylate polymer, phenolic resin, ceramic material or the like in order to reduce the possibility of eddy current losses when a pulsed magnetic field is generated.

Although elongated magnetizable element 10 may be placed directly on the exterior peripheral surface of mounting cylinder 11, it is preferred that it be placed in a recess machined in the outer surfaces of cylinder 11 to act both as a guide for winding element 10 onto cylinder 11 and as means for preventing shifting of the element longitudinally up or down the surface of cylinder 11 causing it to be displaced away from writing coil 51 in chase 14 on the inside of said cylinder 11. Elongated magnetizable element 10 may take almost any shape e.g., flat strip, round wire, V-shaped wire and the like, but for the illustrated embodiment, a round wire is used. In addition, the material from which element 10 is constructed may be any ferromagnetic material common in the wire recording art. In the present embodiment a nickel-steel wire having some degree of magnetic remanence is used. In general, the material of element 10 should have a substantially rectangular hysterisis loop characteristic. It must be cautioned that unless special alloys are used, magnetizable element 10 must be wound firmly about mounting cylinder 11 such as to maintain element 10 under tension at all times to facilitate formation and propagation of the magnetic domains therein and to maintain proper registry.

To hold write coil 51 in alignment with elongated element 10, helical chase 14 is provided on the inner surface of mounting cylinder 11, juxtaposed element 10. Helical chase 14 is cut as deep as permissible to achieve close proximity of write coil 51 to element 10 as possibly yet maintain the structural integrity of mounting cylinder 11. The purpose of maintaining close proximity of coil 51 to element 10 is to reduce the amount of current in coil 51 necessary to establish a magnetized domain in element 10.

Figure 2:
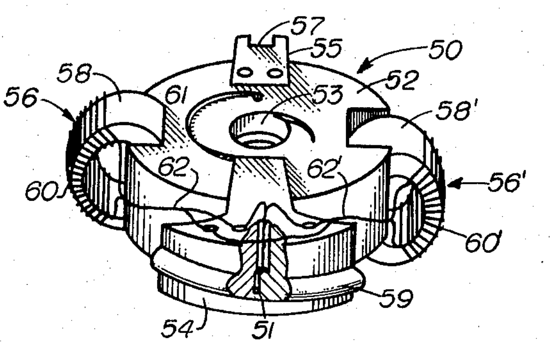
FIGURE 2 is an isometric view of the writing head assembly as it appears removed from the register.

Referring now to FIGURE 2, writing head assembly 50 is shown comprising basically an annular writing head armature 52 of high permeability magnetic material, having central hole 53 threaded to fit lead screw 12, and about the outer periphery of which is mounted writing head 54, drive arm guide 55 and quasi toroidal pick-up ring coil assemblies 56 and 56'.

In order to properly guide writing head 54 and write coil 51, a radial chine is provided on the face of writing head 54 and shaped to fit and slide along helical chase 14. Flush with, or protruding slightly from, the outermost surface of chine 59 at its center, is the top of a coil 51. In this position, coil 51 will be at the deepest portion of helical chase 14 and thus as close at possible to magnetizable element 10.

In this embodiment, write coil 51 is shown as a coil wound around a magnetic core. Other types of magnetic recording heads of the horseshoe-shaped slit-gap type and the like common in the magnetic tape or wire recording art may also be employed in the register of this invention in order to create a magnetized domain in magnetizable element 10. Although the function of write coil 51 is mainly one of establishing magnetic domains, it may also function to detect magnetic domain walls which pass by, through induction of current in coil 51 from the varying magnetic field of the moving domain wall.

To maintain write coil 51 in as close a proximity to magnetizable element 10 and additionally accommodate for imperfections in, and out-of-roundness of, mounting cylinder 11, resilient means in the form of writing head retainer spring 61 is provided to apply a force against writing head 54, which also is arranged to be radially slidable on writing head armature 52, holding it in intimate contact with the inner surface of mounting cylinder 11.

The use of slip rings and brushes to achieve electrical connection to write coil 51 is avoided in the illustrated preferred embodiment of this invention through the inductive coupling of write helix 15 to pick-up ring coils 56 and 56'. Pick-up ring coils 56 and 56' comprise an electrical conducting ring 58 and 58' having, respectively toroidal windings 60 and 60'. Electrical conducting rings 58 and 58' are arranged to encircle one or more loops of write helix 15. When a pulsed or time varying current passes through write helix 15, the resulting magnetic lines of force will cut electrically conductive rings 58 and 58' causing a current to flow therein further causing a magnetic field to be built up about rings 58 and 58' in turn causing a current to flow in toroidal windings 60 and 60'. Conductor leads 62 and 62' from toroidal windings 60 and 60' respectively are connected in series to write coil 51 in order to obtain as high a voltage as possible to cause a current to flow through, i.e., "drive," write coil 51. Write helix 15 is energized through write helix electrical contact 32 acting as one electrical contact with outer housing 25 acting as the other electrical contact.

Figure 4:
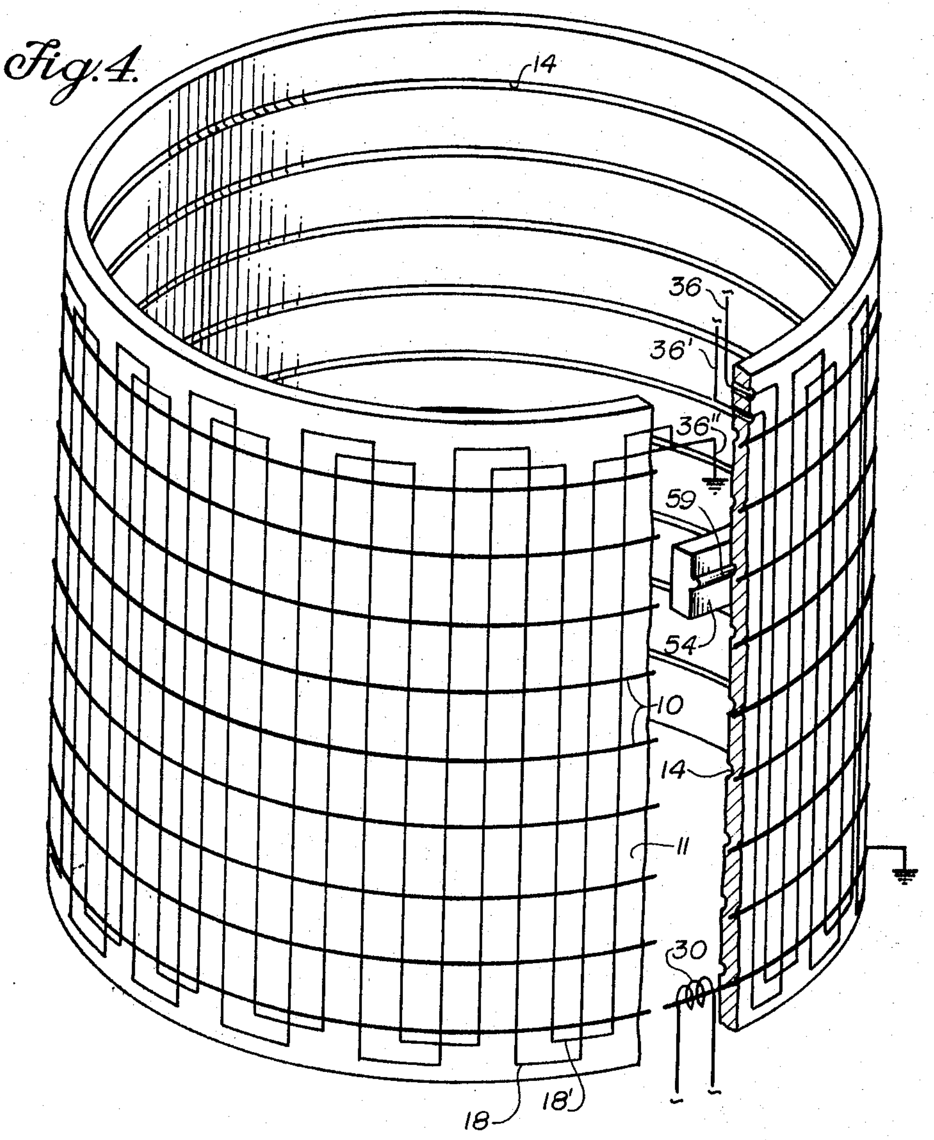
FIGURE 4 is a simplified isometric section through only the mounting cylinder of this invention showing in greater detail the arrangement of the writing coil, magnetizable element and propagating conductors.

Referring to FIGURE 4, propagating conductors 18 and 18' are arranged as described supra, alternately spaced parallel in a cylindrical shell configuration circumjacent mounting cylinder 11 and with the conductors longitudinally at right angles to magnetizable element 10. The purpose of propagating conductors 18 and 18' is to achive a magnetic field having cyclical variations in intensity along a path circumferentially about the periphery of mounting cylinder 11 and at the same time rotating circumferentially about cylinder 11 much as in the manner of a squirrel cage or synchronous alternating current electric motor. To achieve this result, propagating conductor 18 is placed substantially at right angles over magnetizable element 10 approximately parallel to the longitudinal axis of mounting cylinder 11, and reversing direction at each end of cylinder 11 while advancing a given distance along the periphery of cylinder 11 to form a parallel spaced array of one conductor. Propagating conductor 18' is also placed over magnetizable element 10 in a similar fashion as propagating conductor 18 but advanced or offset one half the distance between the parallel runs of propagating conductor 18.

Propagating conductors 18 and 18' may be fastened to mounting cylinder 11 either by adhesive means or formed on a flexible electrically insulated backing material (not shown) using printed or etched circuit techniques common in the art and then wrapping the conductors with backing material about the periphery of mounting cylinder 11.

In the two phase embodiment illustrated, the propagating function is achieved by alternately energizing conductors 18 and 18'. By energizing conductor 18 with, for example, a square or rapidly rising wave shaped alternating current, the magnetized domain immediately adjacent conductor 18 will be pushed, i.e., propagated away from the magnetic field surrounding conductor 18. By adjusting the intensity of the magnetic field, the velocity of propagation of the magnetic domain wall along element 10 may be controlled. By adjusting the magnetic field frequency (in conjunction with magnetic field intensity) to allow sufficient time to propagate the magnetized domain wall to a point just beyond conductor 18', the process may be repeated but in this case by energizing conductor 18' to propagate the magnetic domain further along element 10. Thus by synchronously alternating the current flowing in conductors 18 and 18' a magnetic field is created which is cyclically varying in intensity and rotating about mounting cylinder 11, propagating, in unison, all the magnetic domain previously established in magnetizable element 10. More details of the foregoing procedure as applied to different apparatus are disclosed in U.S. Patent No. 3,137,845 and such disclosure is incorporated herein by reference.

It can also be seen, that, although only a two phase propagating system is illustrated for the preferred embodiment, a three or more phase system could be employed with the addition of additional propagating conductors. Each propagating conductor for each phase would be mounted, in the manner of the preferred embodiment, about the periphery of mounting cylinder 11 but with each propagating conductor advanced proportionally, according to the number of phases, circumferentially relative to the propagating conductor of the other phases. For example, in a three phase system, each propagating conductor would advance, circumferentially one-third the distance between parallel runs of any one propagating conductor.

It can additionally be seen that several sets of propagating conductors may also be used so that two or more sources of control can independently propagate the magnetized domains in element 10 eliminating the need for electronic switching control of signals from separate sources.

Figure 3:
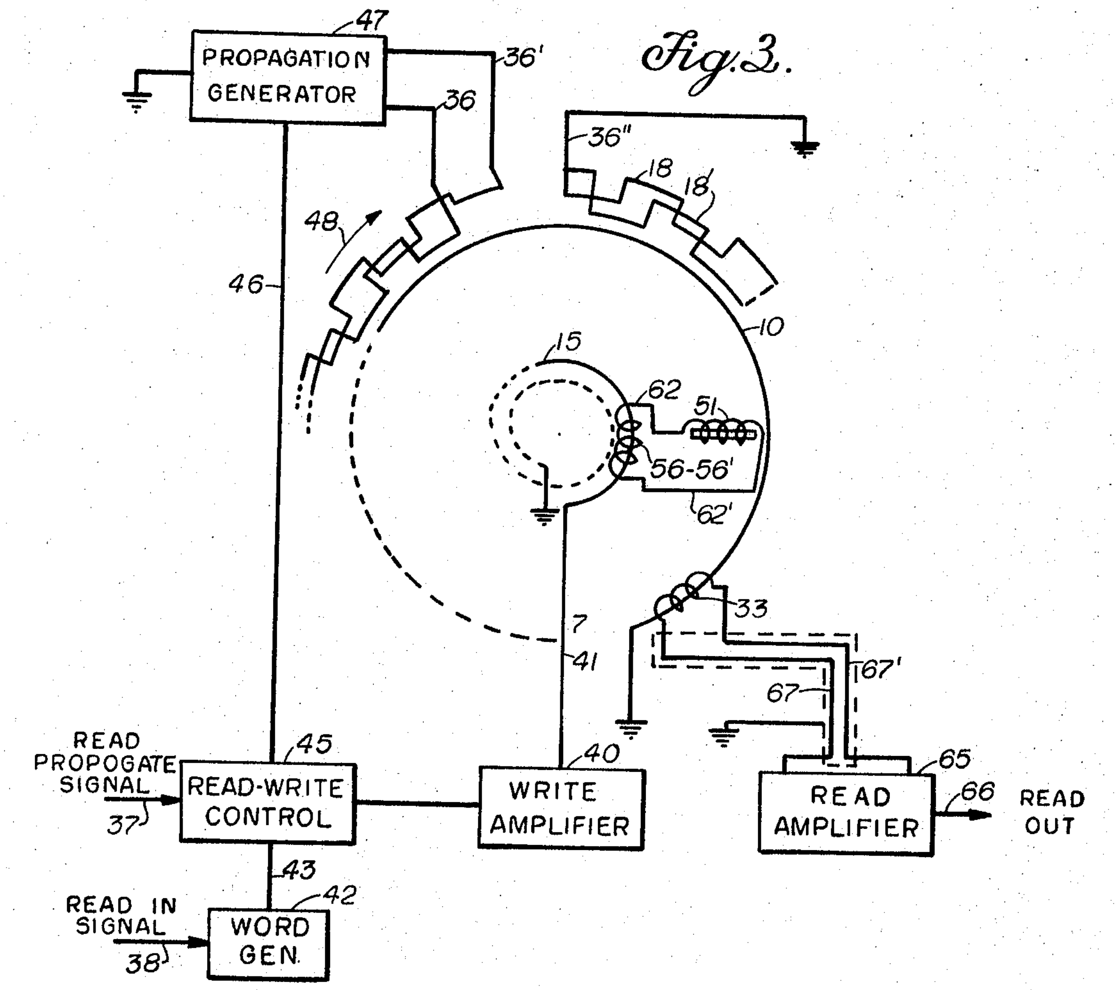
FIGURE 3 is a schematic diagram of a circuit incorporating the register of this invention.

The information storage register of this invention may be incorporated in any one of a multitude of circuits, one of which is illustrated in FIGURE 3.

In this particular circuit, a write amplifier 40 is connected to write helix 15 through transmission line 41 and is used to amplify the pulsed current from word generator 42, after passing through read-write control 45, to *a* magnitude sufficient to generate a current in write coil 51 to create a magnetic domain in magnetizable element 10.

Read-write control 45 is also connected tot propagating generator 47 whose polyphase output is connected to propagation conductors 18 and 18' through leads 36, 36' and 36''. Propagation generator 47 may be arranged through internal circuitry to remain in operation for a specific period of time in order to permit all magnetized domains in magnetizable element 10 to be propagated past read coil 33 or, propagation generator 47 may be controlled from a remote source, such as a computer or like control device (not shown) for a greater or lesser period of time as required. For the present embodiment, control of propagation generator 47 is through read-write control 45.

The signal to extract or read out the information stored in magnetizable element 10 by propagating the magnetic domains therein is indicated by read-propagate arrow 37. The signal to introduce or read-in pulsed information into the register of this invention is indicated by read-in arrow 38 which actuates word generator 42. The read-out signal or output information, is indicated by read-out arrow 66 and is the consequence of the current generated in read coil 33 by the passage of magnetic domains along element 10 therethrough, and passing through shielded cable conductor 67 and 67', being amplified by read amplifier 65. It should also be noted that the polarity of the output signal of read amplifier 65 depends upon the polraity of the magnetized domain wall passing through read coil 33. Thus the direction of current in write coil 51, since it determines polarity of the magnetized domain in element 10, will determine the polarity of the pulse generated in coil 33 and read out as signal 55. It will be appreciated that, in the practice of this invention, the read-out pulse signal from read coil 33 will be quite small compared with the pulsed signals to write coil 51, because of the relatively low level intensities of the magnetic field generated by the domains established in magnetizable element 10. For this reason, read amplifier 65 must have a relatively high amplification ratio with a low signal-to-noise ratio. Since amplifiers having such characteristics are sensitive to signals generated from stray electrical fields, shielded coaxial connector 39 (FIGURE 1) is used, in conjunction with shielded cable conductors 67 and 67', when connecting read coil 33 to read amplifier 65.

To place information into the register of this invention read-in signal 38 from any convenient signal producing source such as a switch, computer, or the like, actuates word generator 42 which translates read-in signal 38 either into a single pulse or a group of pulses of electrical current which are transmitted to read-write control 45 through transmission line 43. Read-write control 45 in this embodiment, acts in the manner of a gating circuit which coordinates the pulse to be entered in the register with operation of the propagation generator 47. As the domains are created in element 10 they are propagated along the element. In the preferred embodiment, the record pulse is introduced during operation (either continuous or intermittent) of the propagation generator. The signal then passes into write amplifier 40 by way of transmission line 44 where it is amplified and transmitted to write helix 15 through transmission line 41. The lines of force of the fluctuating magnetic field created by the current pulse signal cut across series connected pick-up ring coils 56 and 56', here in FIGURE 3 shown diagrammatically as one coil, therein generating a pulsed current which passes through leads 62 and 62' to write coil 51 which in turn generates a fluctuating magnetic field causing a magnetized domain or region to be created in magnetizable element 10 in the correct phase relation to the propagation fields.

Briefly referring now to FIGURE 1 the method of mechanically adjusting the register of this invention to insert information therein may be shown. Writing head assembly 50 may be rotated around lead screw 12 and write helix 15 by manually (or mechanically) rotating shaft 30 having drive arm 31 attached and which arm 31 also slidably engages slot 57 on drive arm guide 55, which guide 55 is also a part of writing head assembly 50. Both write helix 15 and lead screw 12 have the same helical pitch and remain stationary. Journal 34 is provided between shaft 30 and lead arrow 12 to prevent rotation of shaft 30 and drive arm 31 while providing vertical support for stationary lead screw 12.

Referring again to FIGURE 3, write coil 51 may be positioned anywhere along magnetizable element 10 and the process described supra for creating a magnetized domain therein repeated. Thus a series of magnetized domains may be established along magnetizable element 10 at measured or known intervals.

When the register has been filled with the desired amount of information by repetition of the above described method, retrieval of the information is achieved by sending read-propagate signal 37 into read-write control 45. Read-propagate signal 37 as discussed supra may be generated by any convenient source such as a switch, computer and the like. Read-write control 45 also discussed supra, in this embodiment is a gating circuit which coordinates the signal entering the write amplifier 40 with the operation of propagation generator 47. An appropriate signal is transmitted from read-write control 45 through transmission line 46 to progagation generator 47 to cause said generator 47 to energize propagation conductors 18 and 18'; through conductors 36, 36' and 36", with a polyphase alternating current magnetic field that pushes, i.e., propagates, the magnetized domains along element 10 and rotating in the direction of arrow 48. The intensity of the propagating current is adjusted to overcome the forces of magnetic remanence and apply a force to switch the flux state of element 10 and to cause the magnetized domains in elongated magnetizable element 10 to be propagated therealong towards read coil 33. As the magnetized domains pass along magnetizable element 10 and through read coils 33, the magnetic lines of force surrounding each domain will cut across the turns of read coil 33, generating, therein, a fluctuating electrical current of a polarity dependent upon polarity of the magnetic domains which is amplified by read amplifier 65 as described supra. Since read coil 33 surrounds magnetizable element 10, any stray electrical current flowing in element 10 will cause a current to be generated in read coil 33. It is thus good practice to ground one end of element 10 to maintain it at a constant potential with the other parts of the register, for example, outer housing 25, mounting cylinder 11 and the like.

It can be seen that the distance between the maxima and minima of the cyclic variations in magnetic intensity about the periphery of mounting cylinder 11 is equal to the spacing between propagating conductors 18 and 18'. It can also be seen that the maxima and minima of the cyclic variations all rotate in unison thus propagating all the magnetized domains along element 10 in unison at a velocity along element 10 which is determined by the rotating frequency of the alternating polyphase current. Thus the output, or information signal, appears as a series of time dependent pulses and spaces which are additionally coded as to polarity of pulse depending upon the direction of current through read coil 51 when a magnetic domain is created in magnetizable element 10.

Thus, it can be seen that the output signal from the register of this invention is readily adaptable to utilization in a digital computer or other device capable of assimilating serial digital information.

Although the foregoing embodiment has been described in detail, there are obviously many other embodiments and variations in configuration which can be made by a person skilled in the art without departing from the spirit, scope or principle of this invention. Therefore this invention is not to be limited except in accordance with the scope of the appended claims.

What is claimed is:

1. In a magnetic shift register storage device for storing signals from a signal processing means the combination comprising an elongated magnetizable element, means movable along said elongated magnetizable element for establishing and detecting magnetized domains therein, means stationary with respect to said movable means for inductively coupling said movable means to said signal processing means for transferring signals therebetween, means for propagating said magnetized domains along said elongated magnetizable element, and means proximate said magnetizable element for detecting said magnetized domains as they propagate along said magnetizable element.

2. The apparatus as defined in claim 1 wherein said elongated magnetizable element comprises a wire of magnetizable material wound as a helix around a drum of non-magnetic material.

3. The apparatus as defined in claim 1 wherein said means movable along said elongated magnetizable element for establishing magnetized domains therein comprises means defining a movable writing head coil means for establishing and detecting a magnetic field affixed to said writing head and means for maintaining said writing head and said coil proximate said magnetizable element for establishing magnetized domains therein.

4. The apparatus as defined in claim 3 wherein said means for maintaining said writing head and said coil proximate said magnetizable element comprises a lead screw, means defining a helix having the same pitch as said lead screw and of an electrical conductive wire, armature means engaging said lead screw, write pick-up coil means affixed to said armature means and encircling several turns of said helix, said write pick-up coil electrically connected to said coil means for establishing a magnetic field, drive means for rotating said armature to travel along said lead screw and resilient means for forcing said movable writing head outwardly toward said magnetizable element.

5. The apparatus as defined in claim 1 wherein said means for propagating said magnetic domains along said elongated magnetizable element comprises polyphase electrical conductor array means arranged substantially at right angles to said magnetic element and displaced circumferentially, each conductor for each phase alternately leading and lagging the other according to phase.

6. The apparatus as defined in claim 5 wherein said means for propagating said magnetic domains includes power means electrically connected to said electrical conductors for generating a polyphase driving magnetic field propagating along said magnetizable element.

7. The apparatus as defined in claim 6 wherein said power means electrically connected to said electrical conductors generates a polyphase driving magnetic field undirectionally propagating along said magnetic element.

8. The combination of claim 1, wherein:
said movable means includes a magnetic head,
said elongated magnetizable element is a magnetic wire wound to form a helix, and further including
means for guiding said head in a helical path to successive positions along said magnetic wire.

9. The combination of claim 8, wherein said stationary means is an electrical conductor wound to form a helix that is coaxial and interior said magnetic wire helix, said stationary means constitutes the sole signal coupling between said signal processing means and said magnetic head, and the helical path of said magnetic head is interior of said magnetic wire helix.

References Cited

UNITED STATES PATENTS

| | | | |
|---|---|---|---|
| 3,365,290 | 1/1968 | Smith et al. -------- | 340—174 |
| 3,051,916 | 8/1962 | Rothbart ---------- | 340—174 |

BERNARD KONICK, *Primary Examiner.*

VINCENT P. CANNEY, *Assistant Examiner.*

U.S. Cl. X.R.

340—174